United States Patent [19]

Vivaldi

[11] Patent Number: 4,956,037
[45] Date of Patent: Sep. 11, 1990

[54] COOLED OPTICAL COMPONENT MANUFACTURE

[75] Inventor: Alexander M. Vivaldi, West Palm Beach, Fla.

[73] Assignee: United Technologies Corporation, Hartford, Conn.

[21] Appl. No.: 275,838

[22] Filed: Nov. 25, 1988

[51] Int. Cl.$^5$ .............................................. B32B 31/18
[52] U.S. Cl. ..................................... 156/155; 156/89; 156/256; 156/257; 350/610
[58] Field of Search ................. 156/89, 155, 256, 257; 350/610; 430/321

[56] References Cited

U.S. PATENT DOCUMENTS

| | | | |
|---|---|---|---|
| 2,499,977 | 3/1950 | Scott | 156/155 |
| 4,026,746 | 5/1977 | Straw | 156/155 |
| 4,386,825 | 6/1983 | Stalcup et al. | 350/610 |
| 4,433,045 | 2/1984 | Gowan et al. | 350/610 |
| 4,552,439 | 11/1985 | Hoag et al. | 350/610 |

FOREIGN PATENT DOCUMENTS 68258 6/1979 Japan .................................... 350/610

*Primary Examiner*—Caleb Weston
*Attorney, Agent, or Firm*—Peter R. Ruzek

[57] ABSTRACT

An optical component having a plurality of cooling channels in a surface region underlying its effective surface is manufactured by first forming a precursor of the optical component consisting of a main body which carries the effective surface, and a plurality of solid fugitive material cores embedded in the main body at the desired locations of the cooling channels, and then converting the precursor into at least a portion of the optical component by consolidating the main body, and removing the cores from the cooling channels, such as by melting the fugitive material of the cores.

5 Claims, 1 Drawing Sheet

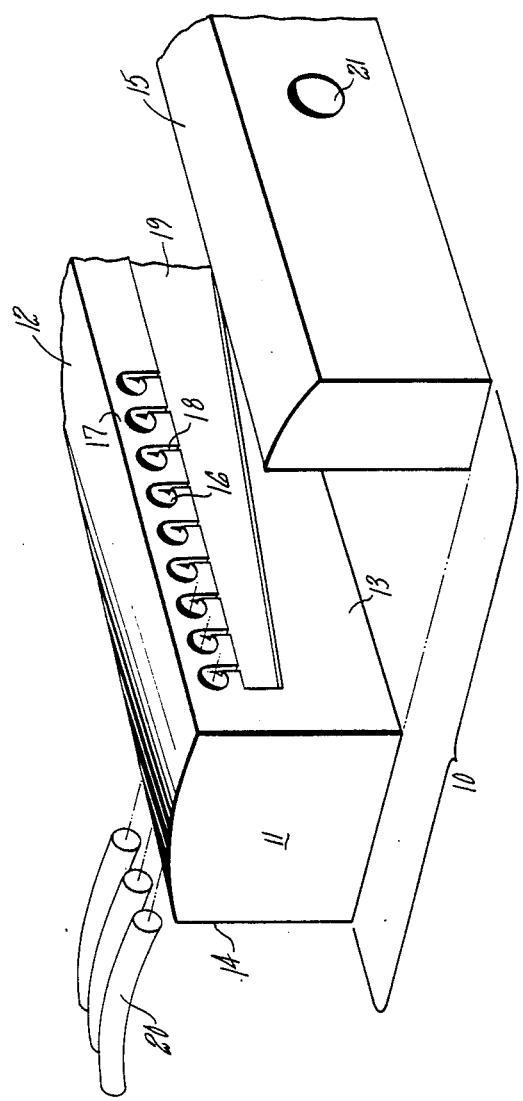

COOLED OPTICAL COMPONENT MANUFACTURE

DESCRIPTION

1. Technical Field

The present invention relates to cooled optical components in general, and more particularly to a method of manufacturing such components and to cooled optical components obtained by using such a method.

2. Background Art

There are already known various constructions of optical components, among &:hem such, especially mirrors, which are provided with cooling channels that are located close to an effective, especially reflecting, surface of the respective optical component and that serve to confine and conduct the flow of a cooling medium which cools the respective surface region of the optical component in question and carries away the heat present in such surface region as a result of, for instance, impingement of a high-power laser beam against the effective surface. Thus, the cooling channels and the adjacent structure of the cooled optical component, together with the inlet manifold for the supply of fresh cooling medium to, and the outlet manifold for the discharge of the heated cooling medium from, the cooling channels, constitute the features of a heat exchanger.

Until quite recently, cooled mirrors of the above type were made exclusively of metallic materials, such as copper and molybdenum, and several techniques have been developed for providing the aforementioned cooling channels in the surface region of each such metallic mirror. A technique which is very popular in this environment involves the machining of the cooling channels and/or other heat exchanger features into one or more relatively thin plates which is or are subsequently bonded onto relatively thick or massive backing structures, which may incorporate additional internal manifolding features, to produce the desired leak-tight optical component assembly. The main reason why this relatively simple and inexpensive procedure may be used in the manufacture of metallic cooled mirrors is that the metallic materials used in this construction for the production of the thin plates possess a high degree of pliability which results not only in an ease of machining the heat exchanger features in the metallic plates but also in an easy conformance of the spatial configuration of the respective plate to the underlying structure to which it is to be bonded and which may have a rather complex shape, such as that of a hyperboloid segment.

With the advent of the development and use of nonmetallic materials, such as reaction sintered silicon carbide, for cooled optical mirrors of the above type, it was considered to use the above approach in the manufacture of such mirrors. However, experience has shown that disappointing results would ensue when using this technique in this environment. This is at least partially attributable to the fact that most if not all nonmetallic materials suited for use in the manufacture of such mirrors exhibit a very limited, if any, pliability and, in fact, are quite brittle, resulting in difficulties in the machining of the heat exchanger features and, possibly even more importantly, in the conforming of thin plates made of such materials to underlying structures having complex shapes. Consequently, the above technique is not suited for use in the manufacture of cooled optical mirrors from nonmetallic materials, except in very rare cases, and even then care must be taken to achieve a very close if not perfect configuration match between the surfaces to be bonded together, which dramatically increases the cost of manufacture of such nonmetallic cooled mirrors by the above technique.

Moreover, certain problems are encountered even if the materials used in the cooled mirror are metallic. For one, inasmuch as close conformity of the courses of the cooling channels to the contour of the effective surface is critical to the performance of the cooled mirror, very close attention must be paid to the precision of the machining of the channels into the thin plates so as to keep the manufacturing tolerances extremely low, which further increases the cost of the manufacture of the cooled mirror. On the other hand, since the cooling channels open over their entire lengths onto the bonded interface between the thin plate and the underlying structure, there is a pronounced danger of heat exchanger blockage and disbonds. These conditions adversely affect the cooled mirror performance and compromise structural integrity of the cooled mirror, respectively.

Accordingly, it is a general object of the present invention to avoid the disadvantages of the prior art.

More particularly, it is an object of the present invention to provide a method of manufacturing cooled optical component, which method does not possess the disadvantages of the known methods of this kind.

Still another object of the present invention is so to develop the method of the type here under consideration as to enhance the structural integrity of the optical component manufactured thereby.

It is yet another object of the present invention to devise a structure of the cooled optical component of the above type which is suited for the implementation of the above method.

A concomitant object of the present invention is design the cooled optical component of the above type in such a manner as to be relatively simple in construction even when the shape of its effective surface is quite complex, inexpensive to manufacture, and yet reliable in operation.

DISCLOSURE OF THE INVENTION

In keeping with these objects and others which will become apparent hereafter, one feature of the present invention involves a method of manufacturing an optical component having a plurality of cooling channels in a surface region underlying an effective surface thereof. According to the invention, this method comprises first forming a precursor of the optical component consisting of a main body which carries the effective surface, and a plurality of solid fugitive material cores embedded in the main body at the desired locations of the cooling channels, and then converting the precursor into the optical component by consolidating the main body and removing the cores from the cooling channels, such as by melting the fugitive material of the cores so that this fugitive material can escape, leaving the cooling channels behind.

BRIEF DESCRIPTION OF THE DRAWING

The present invention will be described in more detail below with reference to the sole Figure of the accompanying drawing which is an exploded perspective view of a grazing hyperboloid mirror component made in accordance with the present invention.

BEST MODE FOR CARRYING OUT THE INVENTION

Referring now to the drawing in detail, it may be seen that the reference numeral 10 has been used therein to identify an optical component made in accordance with the present invention. As shown, the optical component 10, which includes a main element 11, has the configuration of a grazing hyperboloid, that is, it has an effective (i.e. reflective) surface 12 having the configuration of a hyperboloid with a circle as its directrix (side-to-side) and a hyperbole as its generatrix (front-to back).

During the operation of the optical system incorporating the optical component 10, a laser beam is directed against the effective surface 12 at a grazing incidence and is reflected from the effective surface 12 at an angle which depends on the angle of incidence against the particular section of the effective surface 12, which varies from section to section as a function of the configuration of the effective surface 12. The construction of the optical systems of this kind and the operation of the optical component 10 therein are so well known to those active in the optical field that they need not be further described here.

The main element 11 has two planar lateral surfaces 13 and 14, of which the surface 14 is hidden but is similar to the surface 13 to such an extent that the following description of the features of the surface 13 and the cooperation thereof with a cover plate 15 is also applicable to the surface 14 and an associated, non-illustrated cover plate, so that they need not and will not be separately discussed here.

The main element 11 is to be provided with a plurality of cooling channels 16 which are to be situated in a surface reagion 17 of the main body and are to at least generally follow the contour of the effective surface in a direction which is that of the directrix in the illustrated example. The cooling channels 16 have respective inlet and outlet ends which respectively open on the lateral surfaces 13 and 14. The visible inlet (or outlet) ends are connected by respective grooves 18 with a recess 19, and the same correspondingly applies to the invisible outlet (or inlet) ends of the cooling channels 16.

In accordance with the present invention, the cooling channels 16 are obtained by first forming a precursor of the optical component 10 consisting of a main body which carries the effective surface 12, and a plurality of solid fugitive material cores 20 that are embedded in the main body at the desired locations of the cooling channels, and then converting the precursor into the optical component 10, including consolidating the main body into the main element 11, and removing the cores 20 from the cooling channels 16, such as by melting the fugitive material of the cores 20.

Thus, it may be seen that the technique of the present invention involves forming, in a single processing step, the bulk of the mirror structure containing the heat exchanger region and its backing structure into a mold containing the cores 20 of the fugitive material that define the heat exchanger geometry. The forming technique may be cold pressing, hot pressing, injection molding or casting of silicon carbide or another suitable nonmetallic or even metallic material. The composition of the fugitive material of the cores 20 depends on the forming technique. For instance, the fugitive material may be a metal or glass for hot forming processes, or waxes or plastics for cold forming processes.

It may be seen that, inasmuch as only the central portion of the mirror structure is being formed by the above-described forming technique, the ends of the cores 20 are exposed. This provides two benefits. First, these ends can be inserted into the side walls of the mold, so that locational control is achieved for the cores 20. Secondly, the fugitive cores are easily accessed for removal by mechanical, chemical or thermal means.

Once the resultant mirror body or precursor with integral heat exchanger is consolidated by sintering to achieve structural integrity, critical dimension coolant manifolding features may be machined into the lateral surfaces 13 and 14 of the thus obtained main element 11. However, it will be appreciated that the coolant manifolding features may be provided in the lateral regions of the main element 11 or its precursor during the consolidating and/or the forming operation. After the provision of the coolant manifolding features at the lateral surfaces 13 and 14, the respective cover plates, represented by the illustrated cover plate 15, are bonded onto the fully configured core or main element 11 to produce a leak-tight assembly. The cover plate 15 is shown to be provided with an inlet (or outlet) port 21 through which the respective cooling medium is admitted into (or discharged from) the recess 19.

The optical component or mirror 10 of the present invention, when fully assembled, possesses the following advantages over similar optical components obtained by using prior art approaches: There is a reduced fabrication risk with respect to the formation of the heat exchanger geometries, the machining of the manifolding features (since they are provided at surfaces that are readily accessible during the machining of such features, rather than being located in the interior of the main body), and the bonding complexity (because the bonding takes place at the surfaces of the main element 11 and the cover plates that are assuredly planar). Moreover, bondlines are removed from the heat exchanger zone, with attendant elimination of heretofore existing concerns regarding the heat exchanger blockage and disbonds. Last but not least, the technique proposed by the present invention renders it possible to clad the optical or effective surfaces, such as 12, using processes that are thermally or chemically incompatible with known bonding techniques. More particularly, such a cladding, which is required to be provided only over the heat exchanger zone (that is only on the effective surface 12) may be produced prior to the bonding of the cover plates, such as 15, to the main element 10.

While the present invention has been illustrated and described as embodied in a particular construction of a cooled optical mirror component, it will be appreciated that the present invention is not limited to this particular example; rather, the scope of protection of the present invention is to be determined solely from the attached claims.

What is claimed is:

1. A method of manufacturing an optical component having a plurality of cooling channels in a surface region underlying an effective surface thereof, comprising the steps of forming a precursor of the optical component consisting of a main body which carries the effective surface, and a plurality of solid fugitive material cores embedded in the main body at the desired locations of the cooling channels; and converting the precursor into the optical component, including consolidating the main body, removing the cores from the cooling channels, and producing respective input and output manifolds at surface zones of the main body that are spaced from the effective surface and onto which respective input and output ends of the cooling channels open, including forming the input and output manifolds in the respective surface zones, and bonding at least one cover plate to the main body subsequently to said forming step such as to sealingly separate the input and output manifolds from the exterior of the optical component at the interface between the main body and the cover plate.

2. The method as defined in claim 1, wherein said removing step includes melting the fugitive material of the cores.

3. The method as defined in claim 1, wherein said consolidating step includes applying heat to the precursor with attendant simultaneous performance of said removing step by melting the fugitive cores.

4. The method as defined in claim 1, wherein said forming step includes machining the input and output manifolds into the respective surface zones subsequently to said consolidating step.

5. The method as defined in claim 1, wherein said producing step includes shaping the input and output manifolds in the respective surface zones during said consolidating step.

* * * * *

UNITED STATES PATENT AND TRADEMARK OFFICE
CERTIFICATE OF CORRECTION

PATENT NO.  : 4,956,037
DATED       : September 11, 1990
INVENTOR(S) : Alexander M. Vivaldi It is certified that error appears in the above-identified patent and that said Letters Patent is hereby corrected as shown below:

Column 2, Line 38  After "invention is" insert --to--

Column 3, Line 35  "reagion" should be --region--

Signed and Sealed this

Tenth Day of March, 1992

Attest:

HARRY F. MANBECK, JR.

*Attesting Officer*     *Commissioner of Patents and Trademarks*